July 31, 1962

M. OLLEY 3,047,098

VEHICLE DISK BRAKE

Filed June 26, 1959

INVENTOR.
Maurice Olley
BY
HIS ATTORNEY

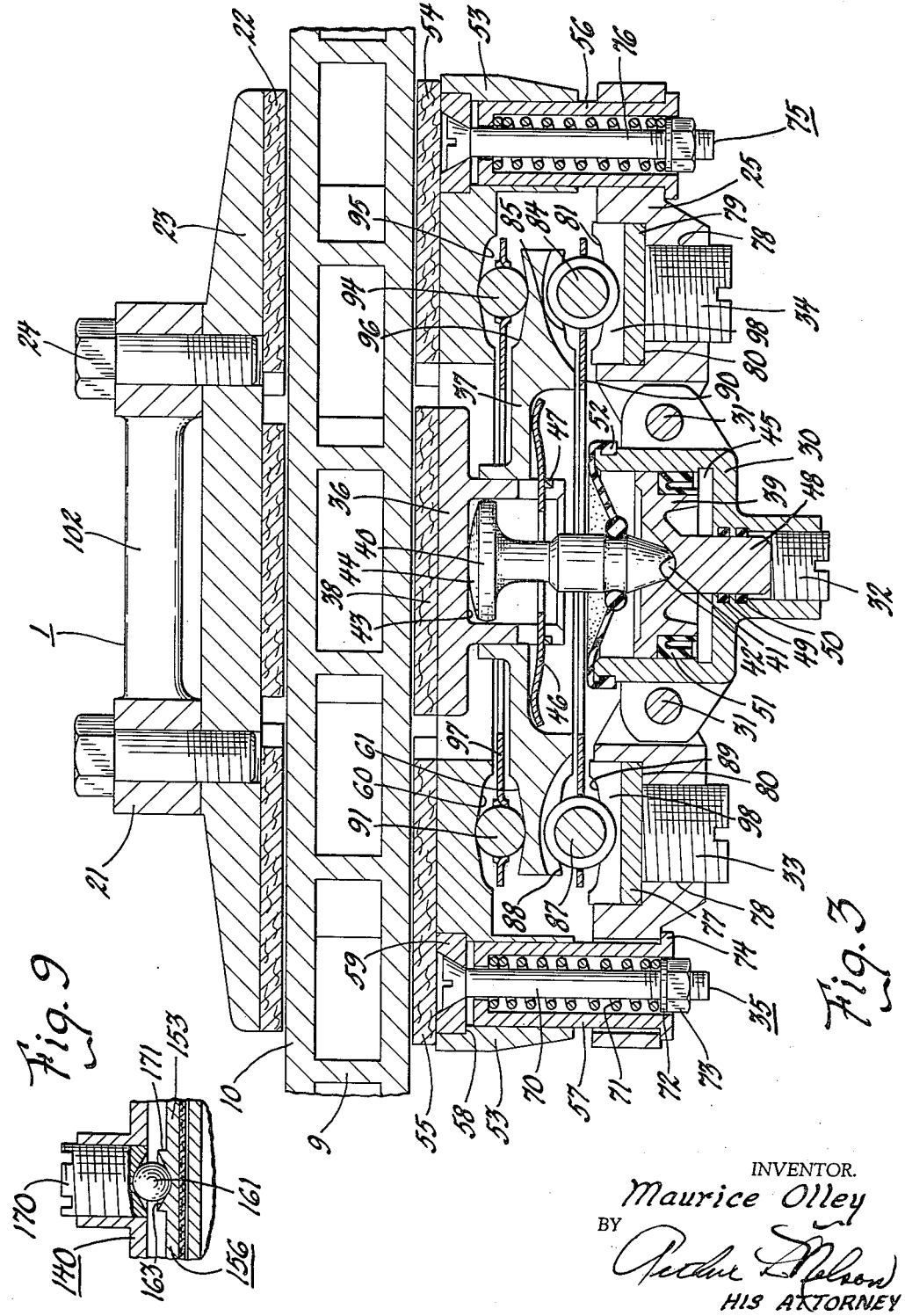

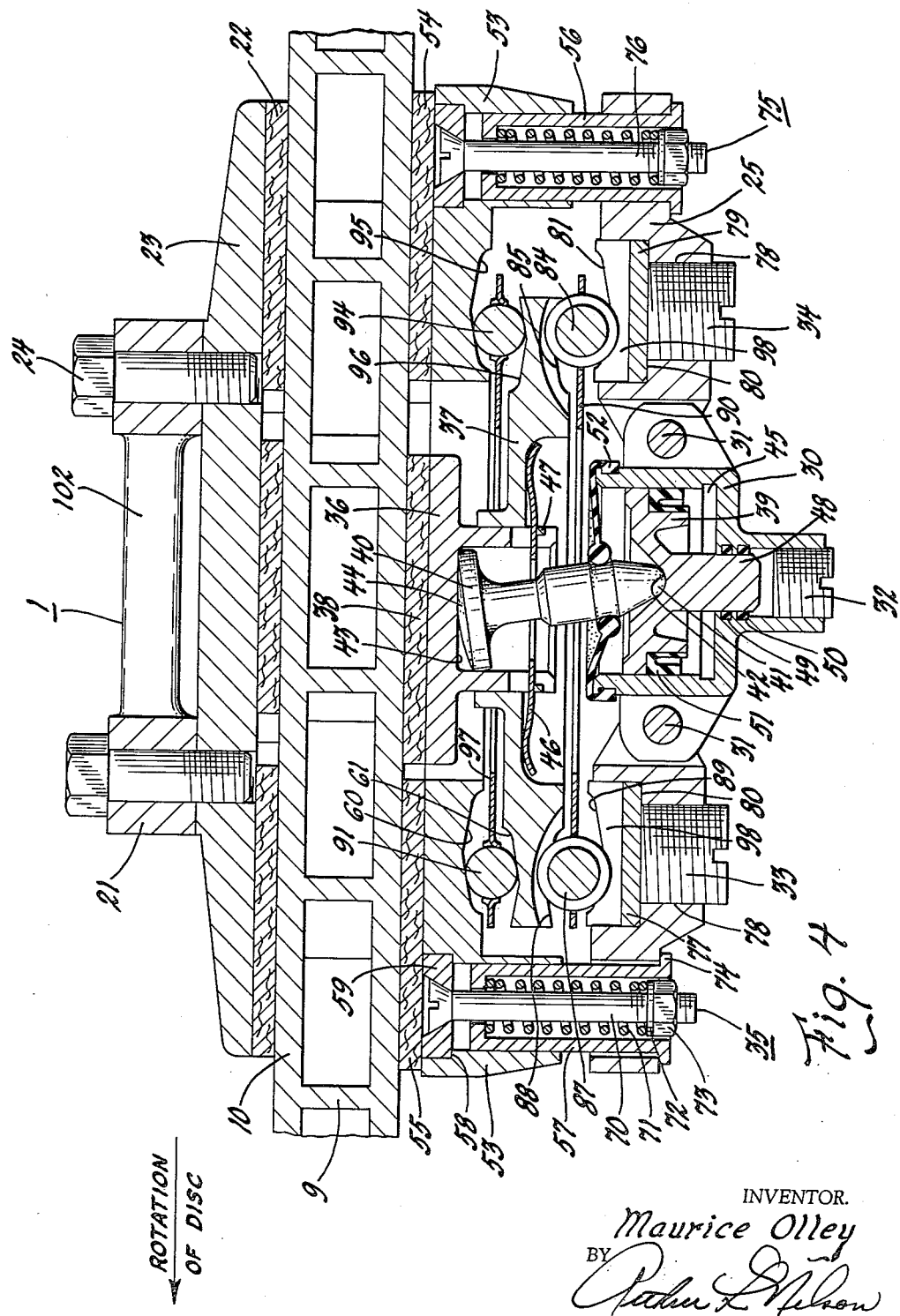

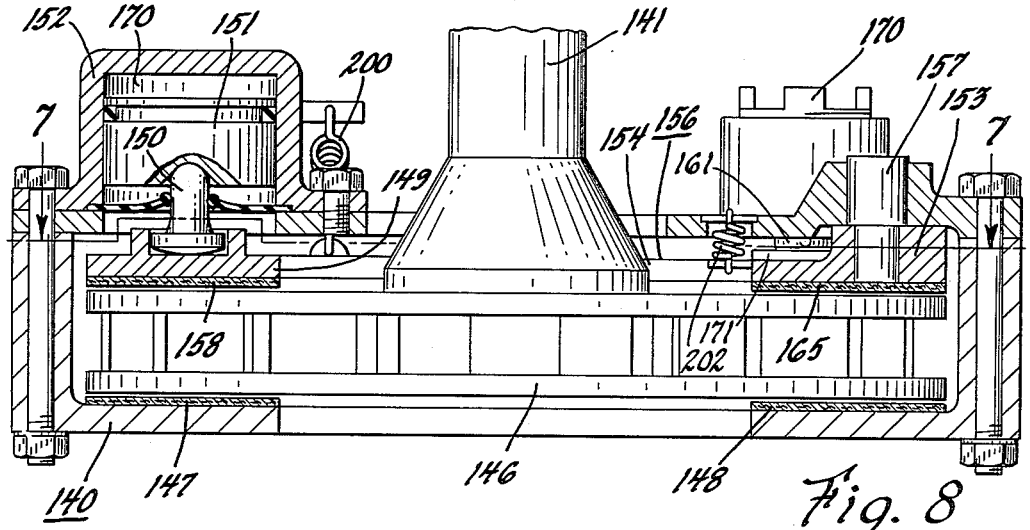
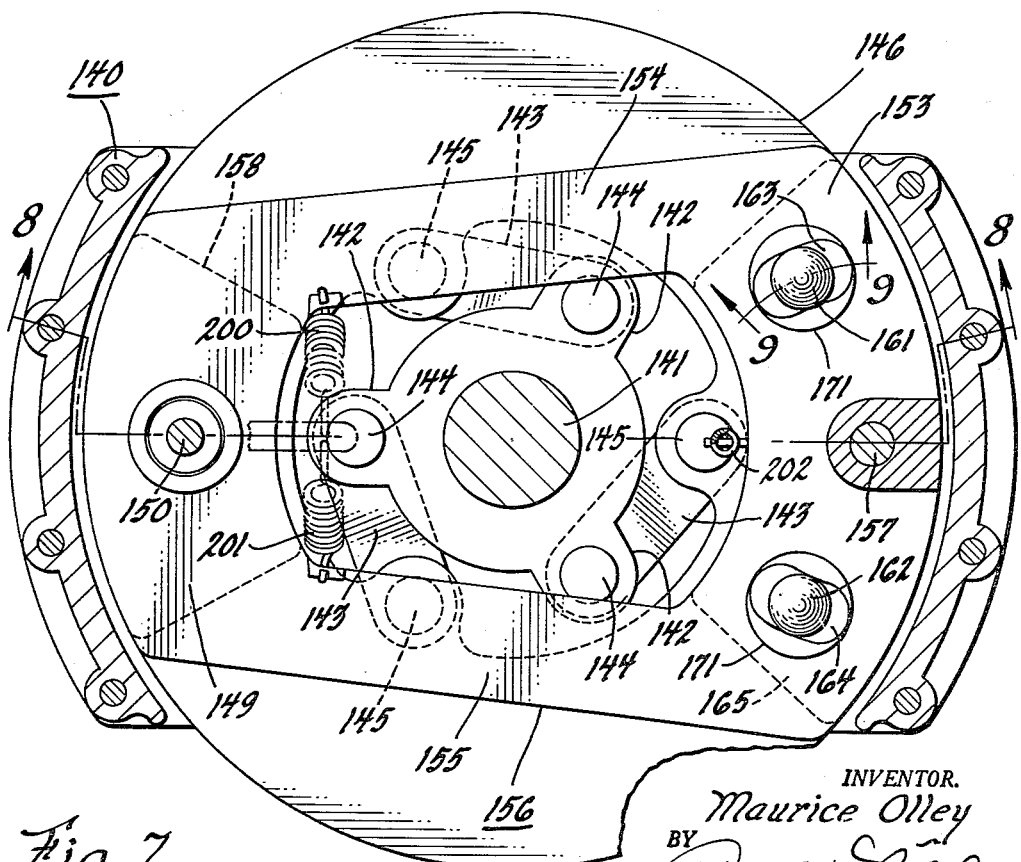

United States Patent Office

3,047,098
Patented July 31, 1962

3,047,098
VEHICLE DISK BRAKE
Maurice Olley, Pasadena, Calif., assignor, by mesne assignments, to General Motors Corporation, Detroit, Mich., a corporation of Delaware
Filed June 26, 1959, Ser. No. 823,257
4 Claims. (Cl. 188—73)

This invention relates to a vehicle disk brake and more particularly to a disk brake having series energization of the primary and secondary shoes.

Vehicle disk brakes employing a cam or ramp in the energization of the brakes often have the problem of locking. This has been partially eliminated by employing a large ramp angle. The use of a large ramp angle also has the disadvantage of reducing the mechanical multiplication or mechanical advantage. The locking of the brakes may be eliminated by series energization.

Accordingly this invention employs the principle of energization of the secondary shoe directly from the primary shoe. The primary shoe is not self-energizing and provides the sole energizing means for the secondary shoe.

It is an object of this invention to provide a non-self-energizing primary shoe in a vehicle disk brake depending solely upon the actuating force for its energization.

It is another object of this invention to provide a primary shoe in a vehicle disk brake to operate as the sole energizing means for actuation of the secondary shoe.

It is a further object of this invention to provide a series energization in a vehicle disk brake wherein the primary shoe is initially actuated and the secondary shoe is subsequently actuated in response to actuation of the primary shoe.

It is a further object of this invention to provide a primary brake shoe which is not self-energizing and a secondary shoe which is not self-energizing but the secondary shoe is energized solely in response to actuation of the primary shoe.

The objects of this invention are accomplished by means of a vehicle disk brake. The primary shoe of the vehicle disk brake is actuated by hydraulic means and is retracted by resilient means. A mechanical actuating means is connected from the primary shoe and provides a force multiplication means using cams for actuating the secondary shoe. The secondary shoe is also provided with a resilient means for retraction of the secondary brake shoe. As the primary brake shoe is hydraulically actuated, it is permitted to shift laterally and actuate the secondary shoe. The secondary shoe, however, is held in a rigid relationship to the brake supporting member and is not permitted to shift laterally as is the primary shoe.

Further objects and advantages of the present invention will be apparent from the following description, reference being had to the accompanying drawings wherein preferred embodiments of the present invention are clearly shown.

FIGURE 3 is a cross-section view of the vehicle disk brake taken on line 3—3 of FIGURE 2. The brake is shown in the inactivated position.

FIGURE 4 is a cross-section view of the vehicle brake as shown in FIGURE 3 except the brake is shown in the actuated position.

FIGURE 7 is a cross-section view taken on line 7—7 of FIGURE 8 showing another modified version of the vehicle disk brake.

FIGURE 8 is a cross-section view taken on line 8—8 of FIGURE 7 showing the modified version as described in FIGURE 7.

FIGURE 9 is a cross-section view taken on line 9—9 of FIGURE 7 showing the cammed means of actuation.

Figure 1:
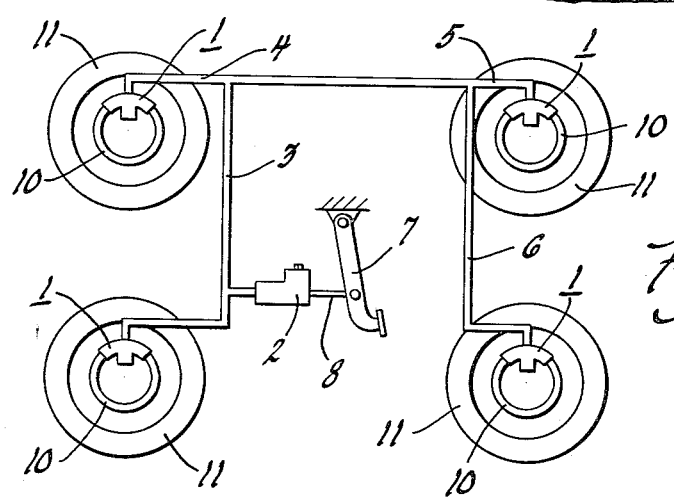
FIGURE 1 is a schematic view showing a fluid system for actuation of the vehicle brake.

FIGURE 1 illustrates a plurality of brakes 1 which are in communication with a hydraulic master cylinder 2 by means of conduits 3, 4, 5 and 6. The fluid system comprising conduits 3, 4, 5 and 6 is a conventional type and is pressurized by means of a manual control lever 7 actuating the push rod 8 which moves a master piston, not shown, within the master cylinder 2. The brakes 1 as shown in FIGURE 1 are all of the same type and an enlarged view of this type of brake is shown in FIGURE 2.

Figure 2:
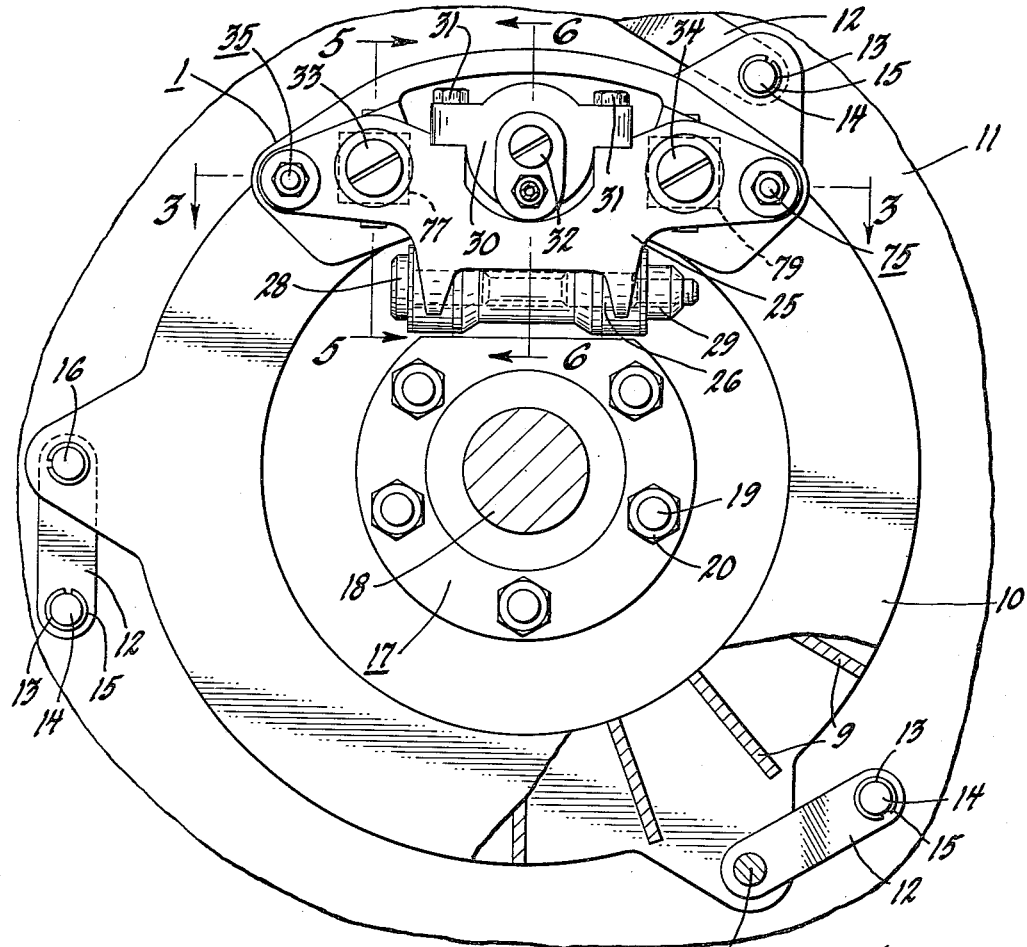
FIGURE 2 is a side elevation view of the vehicle disk brake.

FIGURE 2 is a side elevation view with a portion broken away to clarify location of vanes 9 within the rotating brake disk 10. The brake disk 10 is connected to a portion of the wheel 11 by means of connecting links 12. The connecting links 12 are provided with an opening 13 for receiving pins 14 retained by snap rings 15. The opposite end of link 12 is connected to the rotating brake disk 10 by means of pin 16.

The brakes for retardation of the rotation of the brake disk 10 are mounted on the bracket 17. The bracket 17 is mounted on the shaft housing, not shown, for shaft 18 by means of a plurality of bolts 19 and nuts 20.

Figure 5:
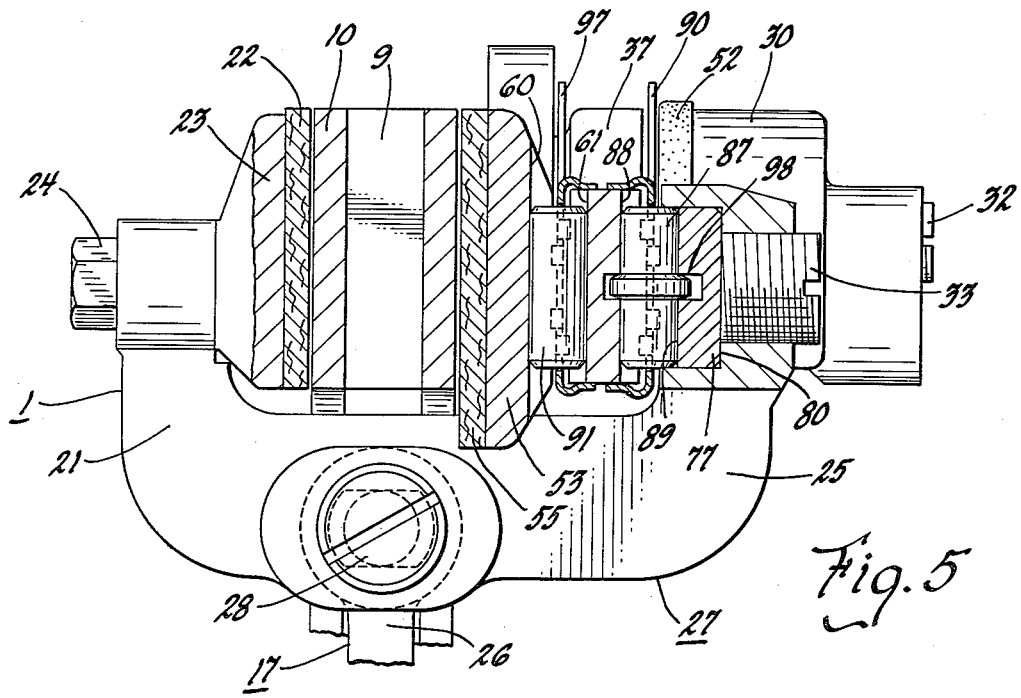
FIGURE 5 is a cross-section view taken on line 5—5 of FIGURE 2.

FIGURE 5 also shows the bracket 17 connected to support member 27 formed in a single casting extending radially outward on the inboard side of and the outboard side of brake disk 10. The arm 21 extends upward to support the friction material 22 in a stationary position relative to arm 21. The friction material 22 is bonded on the shoe 23 and shoe 23 is fastened to the arm 21 by means of bolts 24.

The arm 25 extends axially and radially from a support member 27 to form a support means for the actuating portion of the brake. FIGURE 5 also shows the actuating portion and the arm 25 in its relation to the rotating brake disk 10.

The bracket member 17 is provided with an upwardly extending portion 26 for receiving pin 28. The pin 28 extends through a cylindrical opening in the support member 27 and also the cylindrical opening in the portion 26 of bracket 17. The bolt 28 is maintained in position by means of nut 29. This provides a pivoting means for the support member 27 on the upper end of the bracket 17.

The arm 25 of the support member 27 provides the framework of the brake actuating portion of the vehicle disk brake. A hydraulic wheel cylinder 30 is mounted on the arm 25 by means of bolts 31. An adjustment screw 32 threadedly engages the outward end of the hydraulic cylinder 30.

The arm 25 has a bifurcated portion for receiving wear adjustment screws 33 and 34. The extreme ends of the bifurcated portion of the arm 25 receive retraction means 35 and 75 for the secondary shoe 53. The hydraulic actuating cylinder and retraction means are more clearly shown in FIGURE 3.

FIGURE 3 illustrates the section view of the vehicle disk brake in the retracted position. The arm 21 of support member 27 is shown supporting the brake shoe 23 by means of bolts 24. The friction material 22 is bonded on the brake shoe 23 which is adjacent to for engagement with the rotating brake disk 10. The primary brake shoe 36 is mounted on the actuating plate 37, which in turn is supported by roller elements and centered by resilient means. The primary brake shoe 36 is provided with friction material 38 adjacent to for engagement with the rotating brake disk 10. The primary brake shoe 36 is slidably mounted within the actuating plate 37 to permit axial movement of the primary brake shoe relative to the actuating plate 37. This movement is provided when the fluid is pressurized within the hydraulic wheel cylinder 30. The piston 39 moves axially within the cylinder 30 and thereby moves the push rod 40 relative to the cylinder 30. The push rod 40 has a spherical surface 41 contacting a mating surface 42 within the hydraulic piston 39. The opposite end of the push rod 40 also has a rounded head where it engages the planar surface 43 in the primary brake shoe 36. The rounded head 44 of the push rod 40 rocks on the planar surface 43 of the primary brake shoe 36 as the primary brake shoe 36 moves laterally as it frictionally engages the rotating brake disk 10. This movement of the primary brake shoe carries the actuating plate 37 laterally as the friction material engages the rotating brake disk 10. This lateral movement provides for the actuation of the secondary shoe.

As the pressurized fluid within the chamber 45 is released, the piston 39 moves axially away from the brake disk 10 and the actuating disk 37 again centers itself within the braking structure. The return spring 46 engages a snap ring 47 on the one side and the actuating plate 37 on its opposite side. The return spring 46 moves the primary brake shoe 36 relative to the actuating plate 37 and away from the brake disk 10.

The wheel cylinder 30 is provided with the adjustment screw 32. The adjustment screw 32 engages the outward end of the stem 48 of the wheel piston 39. The stem 48 is also provided with two seals 49 and 50. A third seal 51 is mounted on the wheel piston 39 sealing the actuating chamber 45 within the hydraulic cylinder 30. A fourth seal or boot 52 is also provided on the opposite side of the piston 39. This seal is primarily a dirt seal on the inner end of cylinder 30.

The secondary shoe 53 is provided with two segments of friction material 54 and 55. The secondary shoe extends around the primary shoe 36. The secondary shoe 53 is mounted on the bifurcated portion of the support arm 25. The support of the secondary shoe 53 is by means of the sleeves 56 and 57. The sleeves 56 and 57 extend through openings in the arm 25 and the secondary brake shoe 53. The secondary brake shoe is provided with a shouldered portion 58 for receiving a washer 59 which retains the bolt 70. The bolt 70 extends through an opening in the sleeve 57 and has a spring 71 mounted concentrically on itself. The bolt has a washer 72 and a nut 73 maintaining the spring 71 in a position with the sleeve 57. The sleeve 57 is also provided with a radial flange 74 which engages the bifurcated portion of the arm 25.

The opposite side of the secondary shoe 53 is provided with a similar retraction means 75. The retraction means 75 and 35 operate on opposite ends of the secondary shoe 53 and maintain a balanced relationship of the secondary shoe 53 within the braking structure.

The arm 25 of the support member 27 also retains secondary brake adjusting screws 34 and 33. The screws 34 and 33 each operate in the same manner and provide symmetrical operation of the relay parts of the secondary shoe 53. Screw 34 threadedly engages a hole 78 within the arm 25. A pressure plate 79 abuts a shouldered portion 80 within the arm 25. The ramp portion 81 of plate 79 is inserted in the opening of the arm 25.

The secondary brake shoe 53 is also provided with a cammed surface or ramp on the side opposite from the portion retaining the friction material 54 and 55. This cammed surface is shown as two inclined planes with rounded ends on the extreme portions of the cam surface.

The actuating plate 37 supports the primary brake shoe 36 and is also provided with mating cammed surfaces facing the cammed surfaces on the secondary brake shoe and also the cammed surfaces of the cammed portion 81 and 89 of pressure plates 79 and 77.

FIGURE 3 shows a roller element 84 between the cammed surfaces 85 and 81. A roller element 87 is also shown between cammed surfaces 88 and 89. The roller elements 84 and 87 are maintained in their relative positions within the braking structure by means of the cage 90. A roller 91 is shown between the cammed surface 60 of the secondary brake shoe and the cammed surface 61 of the actuating plate 37. A roller 94 is shown between the cammed surface 95 of the secondary brake shoe 53 and the cammed surface 96 of the actuating plate 37. The rollers 91 and 94 are maintained in their relative position within the braking structure by means of the cage 97. The rollers 91 and 94 are centered within the braking structure by means of the retraction means 35 and 75. This same is true for the roller elements 84 and 87. The roller elements move laterally when the primary brake shoe is actuated.

FIGURE 5 is a cross-section view showing the roller elements in their relative position within the braking structure. The cages 90 and 97 are shown in cross-section. The roller element 87 is provided with an enlarged portion which falls within a groove 98 which is cut within the pressure plate 77 and the actuating plate 37. These grooves maintain alignment of the roller relative to the actuating plate 37 and the pressure plate 77. The rollers 84 and 87 being supported on pressure plates 79 and 77 provide a mounting for the actuating plate 37. The actuating plate 37 retains the primary shoe 36 in position. Lateral movement of the actuating plate 37 and primary shoe 36 is limited by rollers 84 and 87 together with rollers 94 and 91 acting on the actuating plate 37.

Figure 6:
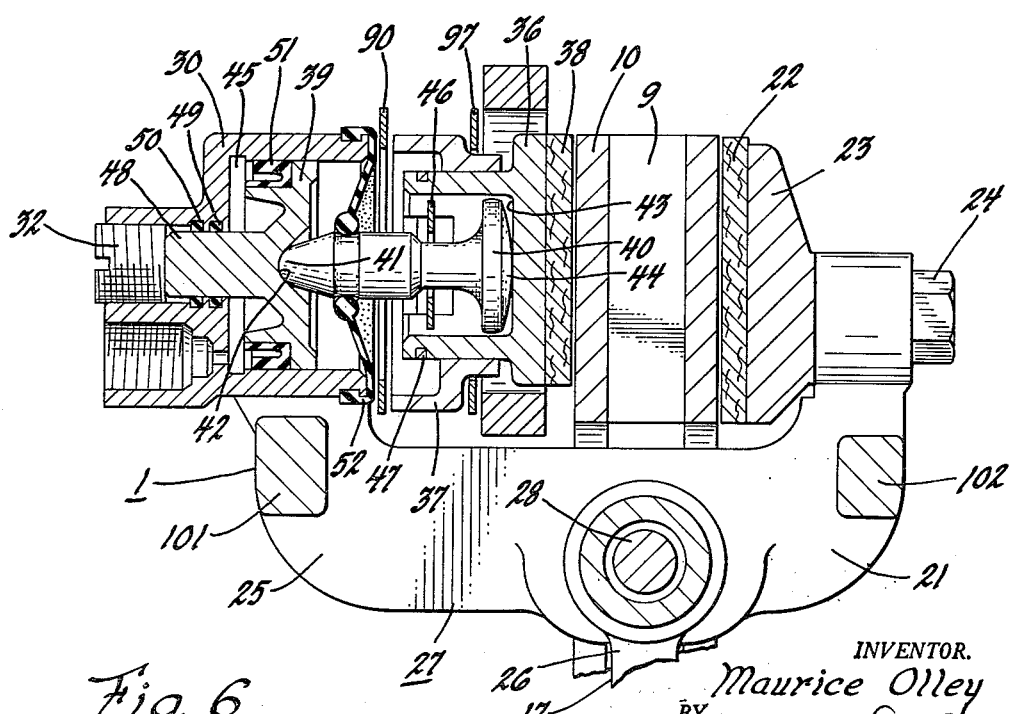
FIGURE 6 is a cross-section view taken on line 6—6 of FIGURE 2.

FIGURE 6 is a cross-section view showing the hydraulic wheel cylinder 30 in an inactivated position. The view also shows the cages 90 and 97 in cross-section. The support member 27, including the arms 21 and 25, is shown partially in cross-section. A portion 101 of the support member 27 extends between the bifurcated portion of arm 25 and a similar portion 102 extends between the bifurcated portion of the arm 21.

The pivotal mounting portion is also shown in this view. The bolt 28 extends through the portion 26 of bracket 17. The bolt 28 has an enlarged portion which bears on the inner periphery of portion 26 of bracket 17, although it is not shown in this view. This is shown by means of a dotted line in FIGURE 2. The mounting of bracket 17 on the housing for the shaft 18 is not shown in this view but is illustrated in FIGURE 2.

As previously pointed out, FIGURE 4 is a view similar to FIGURE 3 except FIGURE 4 shows the brake in the actuated position instead of the inactuated position as in FIGURE 3.

A second version of a vehicle disk brake is illustrated in FIGURES 7, 8, and 9. This version illustrates a housing or brake support member 140, which is mounted on the shaft housing for shaft 141, not shown in connection with the shaft housing, but is of the same general type previously described in the original version. The rotating shaft 141 is provided with extending ears 142 connected to links 143 by means of pins 144. The opposite ends of the links 143 are connected by pins 145 to the rotating brake disk 146. The support member 140 is provided with friction material 147 and 148. The primary brake shoe 149 engages the opposite side of the brake disk 146 from the friction material 147. The primary brake shoe is actuated by means of the push rod 150 actuated by hydraulic wheel piston 151 operating within wheel cylinder 152. The secondary brake shoe 153 is connected to the primary brake shoe 152 by means of arms 154 and 155, which have sufficient flexibility axially to permit contact of the primary shoe prior to contact of the secondary. The secondary and primary brake shoes and the arms 154 and 155 are formed from a single metallic structure, the single metallic structure being designated by the number 156 and pivots about the pin 157. The pin 157 is pivotally mounted on the housing 140 and placed within the center of drag or center of friction of the secondary brake shoe.

The shoe member 156 pivots about the pin 157 as the primary brake shoe 149 is actuated and the frictional material 158 engages the rotating brake disk 146. The frictional engagement of the friction material 158 of the primary brake shoe 149 in rotating the brake shoe member 156 actuates the secondary brake shoe 153. This actuation is accomplished by rolling the balls 161 and 162 in their corresponding slots 163 and 164. The center of the slots 163 and 164 form an arc with the center of the circle being the center of pin 157. The frictional engagement of the friction material 165 of the secondary brake shoe 153 creates a force which is directed through the center of drag of the secondary brake shoe 153 which coincides with the center of the pin 157. With this structure, the secondary shoe is not self-energizing and the sole means for actuation of the secondary shoe is received from the primary shoe actuation.

FIGURE 9 is a cross-section view taken on line 9—9 of FIGURE 7. It will be noted that an adjustment screw 170 is provided to compensate for wear of the secondary brake shoe. The ramps of the secondary brake shoe are placed on embossments 171 and the ramps in the adjusting screws 170 which are carried by the support member 140.

The vehicle disk brake operates in the following manner. FIGURE 3 illustrates the original version shown with the brake in the inactivated position. As the hydraulic wheel piston 39 is actuated within the wheel cylinder 30 by means of pressurizing fluid within the actuating chamber 45, the piston 39 moves axially toward the rotating brake disk 10. The axial movement of piston 39 moves the push rod 40 and the spherical head 44 of push rod 40 carries with the primary brake shoe 36 to engage the friction material 38 with the rotating brake disk 10. As the friction material 38 engages the rotating brake disk 10, a transverse movement is created as the primary brake shoe 36 tends to rotate with the brake disk 10. This transverse movement carries the actuating plate 37 laterally to a position as shown in FIGURE 4. As the actuating plate 37 moves laterally, the rollers 91 and 94 begin to climb the ramps on the secondary brake shoe 53. Simultaneously, the rollers 91 and 94 also climb the ramps on the actuating plate 37. The rollers 84 and 87 climb similar ramps on their corresponding runways on the actuating plate 37 and the adjusting screws 33 and 34. This movement of the actuating plate 37 laterally and relative to the adjustment screws 33 and 34 and the secondary brake shoe 53 creates an axial thrust of the secondary brake shoe 53 toward the rotating brake disk 10. This axial thrust being parallel to the axis of the rotating brake disk 10 causes the friction material 54 and 55 to frictionally engage the rotating disk 10. It will be noted that the secondary brake shoe 53 cannot move laterally relative to the stationary shoe 23. The secondary shoe is not self-energizing and depends solely upon the actuation of the primary brake shoe 36 for its engagement with the rotating brake disk 10. It is further pointed out that the primary brake shoe is not self-energizing either and that it depends solely upon the actuating force of the hydraulic wheel piston 39 in the wheel cylinder 30.

With this type of an action, the locking effect of the braking device may be controlled. It is pointed out that upon release of the brake, the primary brake shoe has no locking tendency as it is not self-energizing. This same is true of the secondary shoe because the secondary is also not self-energizing and depends solely on the primary shoe for its actuation. This feature of series energization has not been previously employed in a ramp type actuation of a vehicle disk brake. It provides for smoother operation and more positive control of the brakes.

As the vehicle brakes are released, the pressure within the actuating chamber 45 of the hydraulic wheel cylinder 30 is decreased and the retraction spring 46 moves the piston 39 to decrease the volume of chamber 45. The retraction spring 46 carries the push rod 40 and the primary brake shoe axially away from the brake disk 10. This movement eliminates any contact between the friction material 38 and the rotating brake disk 10. The primary brake shoe 36 slidably moves relative to the actuating plate 37 and axially from the rotating brake disk 10.

The retraction means 35 and 75 create a similar axial movement of the secondary brake shoe 53 carrying the secondary brake shoe 53 away from the rotating brake disk 10. This movement also centers the roller elements 91, 94, 87 and 84 within their cooperating runways. This centering movement also shifts the actuating plate 37 and the primary brake shoe 36 to a central position within the braking structure.

The second modification, as illustrated in FIGURES 7, 8 and 9, operates in this manner. The hydraulic piston 151 operating within the cylinder 152 moves axially toward the rotating brake disk 146. This movement is created by pressurized fluid within the actuating chamber 170. The piston 151 moves the push rod 150 and the primary brake shoe 149 so the friction material 158 engages the brake disk 146. The frictional force causes a rotative movement of the brake shoe member 156 about its pivoting pin 157. This rotating movement causes the spherical balls 161 and 162 to climb the aforesaid ramps within the curved slots 163 and 164.

It will be noted that the actuation of the primary shoe is solely dependent upon actuation from the hydraulic piston 151. This means that the primary shoe is not self-energizing. The secondary brake shoe 153 is also non-self-energizing, and depends solely for its actuation from the primary shoe. The primary shoe 149 causes the brake shoe member 156 to pivot about the pin 157 which is located in the center of drag or frictional force of the secondary shoe. The rotation of the brake shoe member 156 creates an axial movement of the secondary brake shoe and the friction material 165 to frictionally engage the rotating brake disk 146. This, in turn, creates a braking effect on the rotating brake disk 146.

As the vehicle brakes are released, the fluid within the chamber 170 is no longer pressurized. The retraction springs 200 and 201 center the brake shoe member 156. The counterrotation of the brake shoe member 156 moves the single balls 161 and 162 into the center grooves in their mating slots. This, in turn, permits the brake shoe member 156 to move axially away from the rotating brake disk 146 due to the axial component of the return springs 200 and 201. An additional return spring 202 is placed between the secondary brake shoe 153 and the support member 140. This aids in centering of the spherical balls in the central portion of their groove slots returning the secondary brake shoe to its original retracted position.

While the embodiments of the present invention as herein disclosed constitute preferred forms, it is to be understood that other forms might be adopted.

What is claimed is as follows:

1. A vehicle disk brake comprising in combination; a brake disk for rotation with a vehicle wheel, a brake support member, a primary shoe for frictionally engaging said brake disk, hydraulic actuating means mounted on said brake support member connected to said primary shoe for actuation thereof, a secondary brake shoe actuating plate connected to said primary shoe and extending laterally to transmit a lateral movement of said primary shoe through said secondary brake shoe actuating plate, a secondary shoe, said secondary shoe and said support member provided with camming means, said secondary brake shoe actuating plate provided with mating camming means facing said camming means on said secondary shoe and said support member for reception of rolling elements, said primary shoe depending solely upon the hydraulic means for energizing said primary shoe, said primary shoe providing the sole actuating means through transverse movement of said secondary brake shoe actuating plate thereby providing an axial thrust on said rolling elements which act on said camming means to create an axial thrust on said secondary brake shoe and actuate said secondary shoe subsequent to actuation of said primary shoe.

2. A vehicle disk brake comprising in combination; a brake disk for rotating with a vehicle wheel, a stator member, a brake support member mounted on said stator member, a primary brake shoe placed within said brake support member for frictionally engaging said rotating brake disk, actuating means for said primary shoe mounted on said brake support member, a secondary brake shoe in spaced relation to said primary brake shoe for frictionally engaging said rotating brake disk, camming surfaces on said secondary brake shoe and support member, a secondary brake shoe actuating plate slidably supporting said primary brake shoe for axial movement of said primary shoe to frictionally engage said rotating brake disk, means mounting said secondary brake shoe actuating plate for transverse movement with said primary shoe when said primary shoe frictionally engages said rotating disk, said secondary brake shoe actuating plate having cammed surfaces which in combination with said cammed surfaces on said secondary brake shoe and said support member with rolling elements disposed therebetween create axial thrust on said secondary brake shoes to frictionally engage said rotating brake disk subsequent to frictional engagement of said primary brake shoe when said vehicle brakes are actuated.

3. A vehicle disk brake comprising in combination; a brake disk for rotation with a vehicle wheel, a stator member, a brake support member mounted on said stator member, a primary brake shoe, means for actuating said primary brake shoe connected to said brake support member, a secondary brake shoe actuating plate, said primary brake shoe slidably supported within said brake support member by means of said secondary brake shoe actuating plate, said secondary brake shoe actuating plate supporting a primary brake shoe retraction means, said secondary brake shoe actuating plate having cammed surfaces, a secondary brake shoe supported on said brake support member, said support for said secondary brake shoe having secondary brake shoe retraction means, said secondary brake shoe and said support member provided with cammed surfaces facing said cammed surfaces on said secondary brake shoe actuating plate and forming a reception means for rolling elements, said primary brake shoe thereby providing the sole actuating means for said secondary shoe by transmitting a lateral thrust through said secondary brake shoe actuating plate which in turn creates an axial thrust through said rolling elements and said cammed surfaces to said secondary brake shoe for subsequent frictional engagement of said secondary shoe to said primary shoe with said rotating brake disk when said vehicle brakes are actuated.

4. A vehicle disk brake comprising in combination; a brake disk for rotation with a vehicle wheel, a stator member, a brake support member mounted on said stator member, a primary brake shoe, a secondary brake shoe actuating plate slidably supporting said primary shoe for axial movement of said primary shoe relative to said secondary brake shoe actuating plate, means for actuating said primary brake shoe mounted on said primary support member, resilient means mounted on said secondary brake shoe actuating plate for retraction of said primary brake shoe, a secondary brake shoe slidably mounted on said brake support member for axial movement relative to said brake support member, resilient means for retracting said secondary brake shoe axially from said rotating brake disk, cammed surfaces provided on said secondary brake shoe and said brake support member, cammed surfaces provided on said secondary brake shoe actuating plate to form a reception means with said cammed surfaces on said secondary brake shoe and said brake support member for roller elements, said primary brake shoe having non-self-energizing actuation and providing the sole actuating means for said secondary brake shoe by a lateral force through said secondary actuating plate and an axial thrust by means of roller elements on said cammed surfaces to actuate said secondary brake shoes subsequent to primary brake shoe actuation.

References Cited in the file of this patent
UNITED STATES PATENTS

| | | |
|---|---|---|
| 2,419,113 | Bricker | Apr. 15, 1947 |
| 2,596,556 | Hollerith | May 13, 1952 |
| 2,787,341 | Merritt | Apr. 2, 1957 |